United States Patent
Chang et al.

(10) Patent No.: US 9,202,402 B2
(45) Date of Patent: Dec. 1, 2015

(54) THREE-DIMENSIONAL IMAGE DISPLAY DEVICE AND DRIVING METHOD THEREOF

(75) Inventors: Hak Sun Chang, Yongin-si (KR); Jang Wi Ryu, Seoul (KR); Hyo Ju Jung, Incheon (KR); Gak Seok Lee, Cheonan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 497 days.

(21) Appl. No.: 13/464,868

(22) Filed: May 4, 2012

(65) Prior Publication Data

US 2013/0141424 A1 Jun. 6, 2013

(30) Foreign Application Priority Data

Dec. 5, 2011 (KR) .......................... 10-2011-0128975

(51) Int. Cl.
*H04N 13/04* (2006.01)
*G09G 3/00* (2006.01)
*G09G 3/36* (2006.01)

(52) U.S. Cl.
CPC .............. *G09G 3/003* (2013.01); *G09G 3/3688* (2013.01); *H04N 13/0438* (2013.01); *G09G 2320/0209* (2013.01)

(58) Field of Classification Search
USPC .......................................................... 348/51
See application file for complete search history.

(56) References Cited

U.S. PATENT DOCUMENTS

| | | | |
|---|---|---|---|
| 2002/0175907 A1* | 11/2002 | Sekiya et al. ................. | 345/211 |
| 2010/0188439 A1 | 7/2010 | Sugimoto et al. | |
| 2010/0225682 A1 | 9/2010 | Nakahata | |
| 2011/0273439 A1* | 11/2011 | Son et al. ...................... | 345/419 |
| 2011/0279659 A1* | 11/2011 | Jung ............................... | 348/54 |
| 2012/0013601 A1* | 1/2012 | Park et al. ..................... | 345/419 |

FOREIGN PATENT DOCUMENTS

| | | |
|---|---|---|
| JP | 2004-165713 | 6/2004 |
| JP | 2006-343697 | 12/2006 |
| JP | 2009-031523 | 2/2009 |
| KR | 10-2010-0122661 A | 11/2010 |
| KR | 10-2010-0128019 A | 12/2010 |
| KR | 10-2011-0024238 A | 3/2011 |
| KR | 10-2011-0027538 A | 3/2011 |

* cited by examiner

*Primary Examiner* — Tracy Li
(74) *Attorney, Agent, or Firm* — Innovation Counsel LLP

(57) ABSTRACT

The present invention relates to a three-dimensional image display device and a driving method thereof.
A three-dimensional image display device according to an exemplary embodiment of the present invention includes: a display panel assembly including a display panel including a plurality of pixels alternately displaying a left eye image and a right eye image and a data driver transmitting a data voltage to the plurality of pixels; and a shutter member including a left eye shutter and a right eye shutter, wherein a display period of an insertion image is positioned between a display period of the left eye image and a display period of the right eye image, a minimum gray of the left eye image or the right eye image is a first gray that is greater than 0 gray, and a gray of the insertion image is a second gray that is smaller the first gray.

20 Claims, 12 Drawing Sheets

(a)

(b)

THREE-DIMENSIONAL IMAGE DISPLAY DEVICE AND DRIVING METHOD THEREOF

CROSS-REFERENCE TO RELATED APPLICATION

This application claims priority to and the benefit of Korean Patent Application No. 10-2011-0128975 filed in the Korean Intellectual Property Office on Dec. 5, 2011, the entire contents of which are incorporated herein by reference.

BACKGROUND OF THE INVENTION (a) Field of the Invention

The present invention relates generally to a three-dimensional image display device and a driving method thereof, and particularly to a three-dimensional image display device including shutter glasses and a driving method thereof.

(b) Description of the Related Art

In recent years, as part of the general progress in display device technology, 3D stereoscopic image display devices have been attracting attention.

In general, in 3D image display technology, stereoscopic perception of an object is represented by using binocular parallax for recognizing the object at a close distance. That is, when different 2D images are reflected in a left eye and a right eye and the image reflected in the left eye (hereinafter referred to as a "left eye image") and the image reflected in the right eye (hereinafter referred to as a "right eye image") are transferred to the brain, the left eye image and the right eye image are combined in the brain to be recognized as a 3D image with depth perception.

A 3D image display device uses binocular parallax and includes a stereoscopic method using glasses such as shutter glasses, polarized glasses, or the like, or an autostereoscopic method in which lenticular lens and a parallax barrier or the like are disposed in a display device without using glasses.

In the shutter glasses type, the left eye image and the right eye image are divided to be continuously outputted in a display panel, and a left eye shutter and a right eye shutter of the shutter glasses are selectively opened or closed by control of a shutter controller, thereby displaying a 3D image. In the shutter glasses type, an image of a predetermined gray is inserted between the frame displaying the left eye image and the frame displaying the right eye image to reduce crosstalk. Crosstalk is undesirable, as it makes the left eye image and the right eye image appear overlapped.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention increases a luminance of the three-dimensional image display device using the shutter glasses and increases a display quality of the three-dimensional image by reducing cross talk.

In one aspect, the invention includes a three-dimensional image display device that includes: a display panel assembly including a display panel including a plurality of pixels alternately displaying a left eye image and a right eye image and a data driver transmitting a data voltage to the plurality of pixels, wherein a display period of an insertion image is positioned between a display period of the left eye image and a display period of the right eye image, a minimum gray level of the left eye image or the right eye image is a first gray level that is greater than 0 gray level, and a gray level of the insertion image is a second gray level that is lower than the first gray level. In another aspect, the invention includes a driving method of a three-dimensional image display device having a display panel assembly including a display panel including a plurality of pixels alternately displaying a left eye image and a right eye image and a data driver transmitting a data voltage to the plurality of pixels, wherein the method includes: displaying an insertion image between a display period of the left eye image and a display period of the right eye image, wherein a minimum gray of the left eye image or the right eye image is a first gray that is greater than 0 gray level, and a gray level of the insertion image is a second gray level that is lower than the first gray level.

The second gray level may be 0.

The data voltage for the first gray level may be in a range from 0V to 2V.

A maximum gray level of the left eye image or the right eye image may be a third gray level, and the third gray may be lower than or equal to a maximum gray level of the entire gray range.

The third gray level may increase with the first gray level.

In a first region of the display panel, a first image which is one of the left eye image and the right eye image may have the first gray level, and a second image which is a remaining portion of the left eye image and the right eye image may have a fourth gray level that is greater than the first gray level, and in a second region of the display panel, the first image may have a fifth gray level that is higher than the first gray level, and the second image may have the fourth gray level.

The display panel may include liquid crystal molecules in a vertical alignment (VA) mode, and the liquid crystal molecules may be in a pretilt state when the left eye image or the right eye image has the first gray level.

According to an exemplary embodiment of the present invention, the luminance of the three-dimensional image display device using shutter glasses may be increased and the display quality of the three-dimensional image may be improved.

DETAILED DESCRIPTION OF THE EMBODIMENTS

Figure 1:
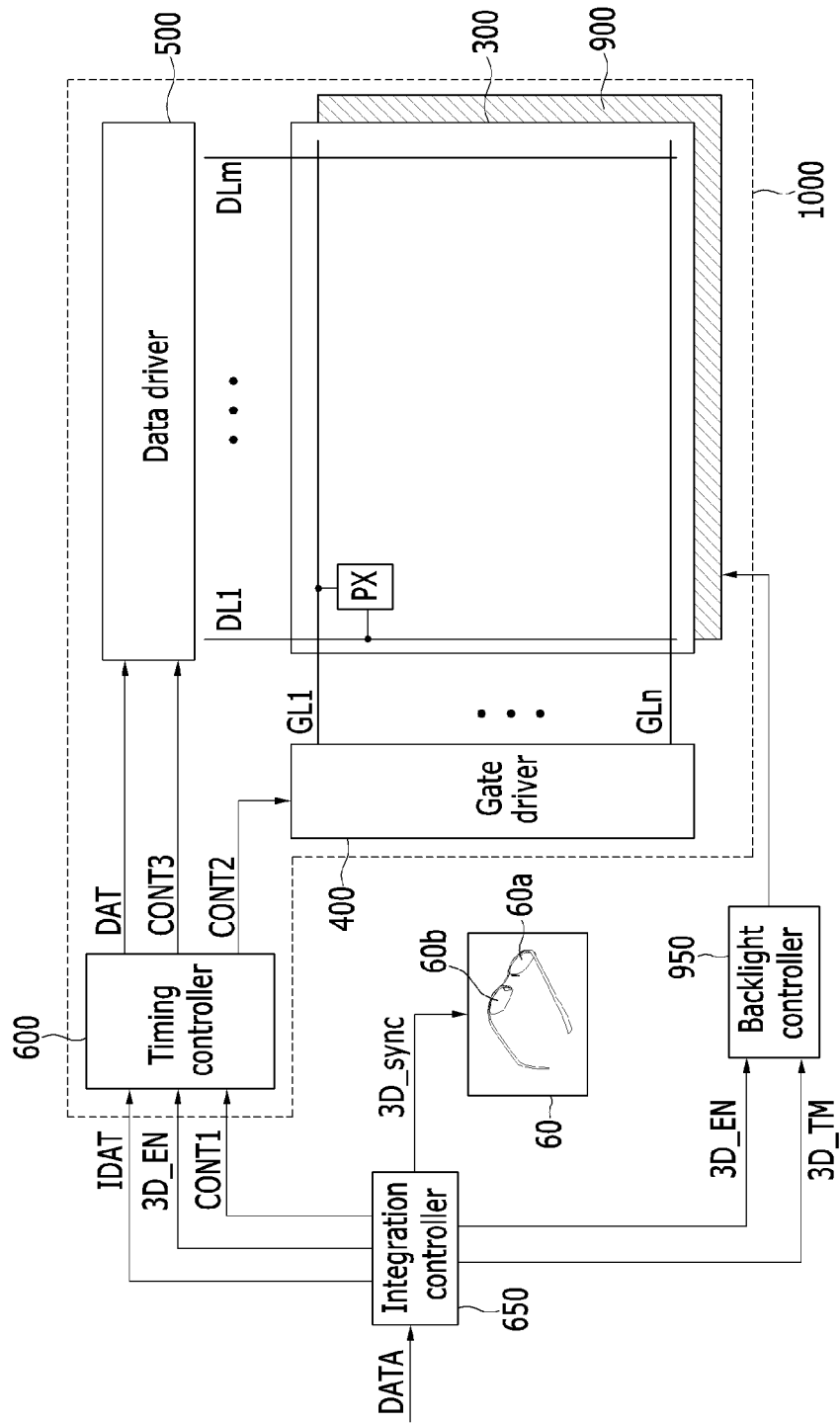
FIG. 1 is a block diagram of a three-dimensional image display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, referring to FIG. 1, a three-dimensional image display device according to an exemplary embodiment of the present invention will be described.

FIG. 1 is a block diagram of a three-dimensional image display device according to an exemplary embodiment of the present invention.

A three-dimensional image display device according to an exemplary embodiment of the present invention includes an integration controller 650, a display panel assembly 1000, a backlight controller 950, and a shutter member 60.

The integration controller 650 receives image information DATA from the outside to generate an input image signal IDAT, a 3D enable signal 3D_EN, a 3D timing signal 3D_TM, a 3D synchronization signal 3D_sync, and an input control signal CONT1 controlling display of the input image signal IDAT. The integration controller 650 may transmit the input image signal IDAT, the 3D enable signal 3D_EN, and the input control signal CONT1 to the timing controller 600 of the display panel assembly 1000, may transmit the 3D enable signal 3D_EN and the 3D timing signal 3D_TM to the backlight controller 950, and may transmit the 3D synchronization signal 3D_sync to the shutter member 60.

The input image signal IDAT contains luminance information and the luminance has a predetermined number of grays, such as $1024=2^{10}$, $256=2^8$, or $64=2^6$ grays. The 3D enable signal 3D_EN instructs an operation into the 3D mode for the three-dimensional image display device, and the 3D timing signal 3D_TM may include timing information of various driving signals according to the 3D mode. The 3D synchronization signal 3D_sync is a signal controlling on/off timing of the shutter included in the shutter member 60 according to the 3D mode. The input control signal CONT1 may include a vertical synchronization signal Vsync, a horizontal synchronizing signal Hsync, a main clock signal MCLK, a data enable signal DE, etc., related to the image display.

The display panel assembly 1000 may be one among several display devices including a liquid crystal display, an electrophoretic display, an organic light emitting display (OLED) device, an electrowetting display (EWD) or a display device using MEMS.

The display panel assembly 1000 according to an exemplary embodiment of the present invention includes a display panel 300 displaying images, a gate driver 400 and a data driver 500 connected thereto, a timing controller 600 controlling them, and a backlight unit 900 supplying light to the display panel 300.

In an equivalent circuit, the display panel 300 includes a plurality of display signal lines, and a plurality of pixels PX connected to the display signal lines. The plurality of pixels PX may be substantially arranged in a matrix form. The display signal lines include a plurality of gate lines GL1 to GLn that transmit gate signals (also referred to as "scanning signals") and data lines DL1 to DLm that transmit data signals. Each pixel PX may include a switching element (not shown) such as a thin film transistor connected to the corresponding gate lines GL1, . . . , GLn and the corresponding data lines DL1, . . . , DLm, and a pixel electrode (not shown) connected thereto.

The timing controller 600 controls the operation of the gate driver 400 and the data driver 500. The timing controller 600 may operate into the 2D mode or the 3D mode according to the 3D enable signal 3D_EN input from the integration controller 650. The timing controller 600 appropriately processes the input image signals IDAT in such a way to be suitable for the operating conditions of the display panel 300 based on the input image signal IDAT and the input control signal CONT1, and generates a gate control signal CONT2 and a data control signal CONT3. The timing controller 600 outputs the gate control signal CONT2 to the gate driver 400, and outputs the data control signal CONT3 and the processed image signal DAT to the data driver 500.

The data driver 500 is connected to the data lines DL1-DLm of the display panel 300, and divides the gray reference voltage transmitted from a gray voltage generator (not shown) to generate a gray voltage for all grays or may receive a plurality of gray voltages from the outside. The data driver 500 receives the digital image signal DAT for the pixel PX of one row according to the data control signal CONT3, and selects the gray voltage corresponding to each digital image signal DAT from the gray voltages to convert the digital image signal DAT into the data voltage Vd and transmit it to the corresponding data lines DL1-DLm. The data voltage Vd may include a data voltage for the left eye image (referred to as a left eye data voltage) and a data voltage for the right eye image (referred to as a right eye data voltage) in the 3D mode.

The gate driver 400 is connected to the gate lines GL1-GLn, and applies the gate signal including a combination of a gate-on voltage Von and a gate-off voltage Voff to the gate lines GL1-GLn. The gate driver 400 applies the gate-on voltage Von to the gate lines GL1-GLn according to the gate control signal CONT2 from the timing controller 600 to turn on the switching element connected to the gate lines GL1-GLn. Thus, the data voltage Vd applied to the data lines DL1-DLm may be applied to the corresponding pixel PX through the turned-on switching element.

The backlight unit 900 may be positioned at the back side of the display panel 300, and includes a light source. Examples of the light source may be a fluorescent lamp such as a cold cathode fluorescent lamp (CCFL), and a light emitting diode (LED).

The display panel assembly 1000 sequentially applies the gate-on voltage Von for all gate lines GL1-GLn as a unit of 1 horizontal period (referred to as "1H", equal to one cycle of the horizontal synchronizing signal Hsync and the data enable signal DE) and applies the data voltage Vd to all pixels PX, thereby displaying the images of one frame. In the 3D mode, one frame may correspond to the duration for which the left eye data voltage is applied for all pixels PX, or the duration for which the right eye data voltage is applied for all pixels PX.

An insertion period displaying an insertion image of a predetermined gray may be inserted between the frame during which the left eye data voltage is applied and the frame during which the right eye data voltage is applied. The insertion period may divide the left eye image and the right eye image, thereby preventing crosstalk that causes the left eye image and the right eye image appear to be overlapped. The gray of the insertion image may be 0 gray or a gray greater than 0 gray according to an exemplary embodiment. The insertion frame may be maintained for an insertion period, which is about the same length as one frame.

The backlight controller 950 receives the 3D timing signal 3D_TM and the 3D enable signal 3D_EN from the integration controller 650 to generate the backlight control signal based thereon, and transmits it to the backlight unit 900. Differently from this, the backlight controller 950 may receive the control signal from the timing controller 600. The backlight unit 900 may be turned on or off during a predetermined time according to the control of the backlight control signal.

The shutter member 60 receives the 3D synchronization signal 3D_sync as a signal for shutoff timing and a shutoff maintaining time of the shutter from the integration controller 650, thereby shutting off the shutter. The 3D synchronization signal 3D_sync may be generated in the timing controller 600 and may be transmitted to the shutter member 60. The 3D synchronization signal 3D_sync may be generated in the timing controller 600 and may be transmitted to the shutter member 60. A user may recognize the image displayed by the display panel assembly 1000 as a 3D image through the operation of the shutter member 60.

The shutter member 60 according to an exemplary embodiment of the present invention may be shutter glasses including right eye shutters 60a and left eye shutters 60b shown in FIG. 1. If the display panel 300 alternately displays the left eye image and the right eye image, the left eye shutter 60b and the right eye shutter 60a of the shutter member 60 alternately block light in synchronization with the display panel assembly 1000. For example, the left eye shutter 60b may be in a closed state during a time that the right eye shutter 60a is in an open state, and the right eye shutter 60a may be in a closed state during a time that the left eye shutter 60b is in the open state. However, according to the display mode, the left eye shutter 60b and the right eye shutter 60a may both be in the open state or both be in the closed state at the same time. If the user recognizes the image of the display panel 300 by using the shutter member 60, the three-dimensional image offering depth perception may be recognized by the difference between the left eye image and the right eye image through the shutter member 60.

Next, an operation method of the three-dimensional image display device will be described with reference to FIG. 2 as well as FIG. 1.

Figure 2:
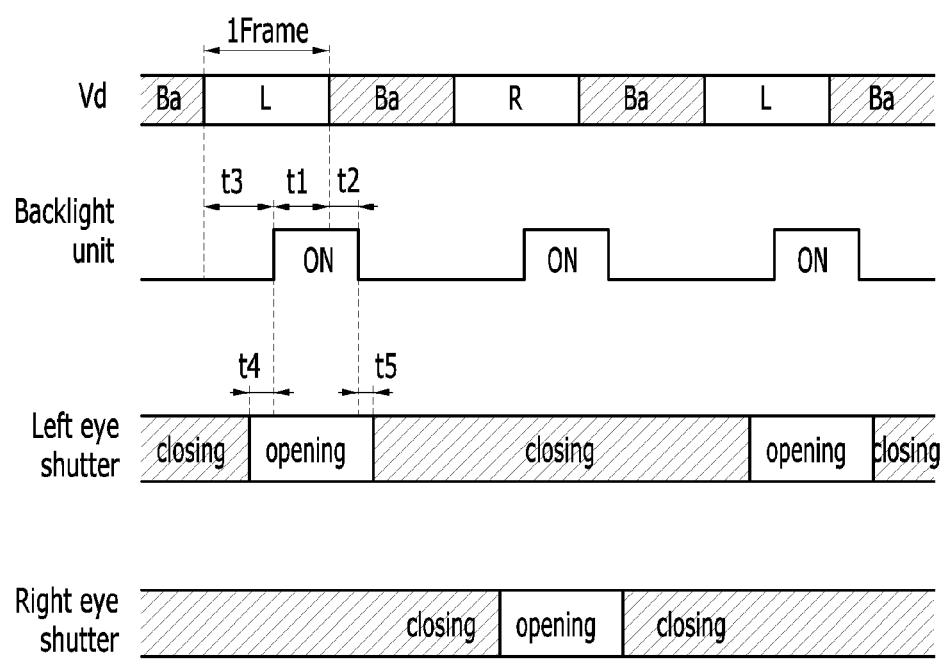
FIG. 2 is a timing diagram of an operation of a three-dimensional image display device according to an exemplary embodiment of the present invention.

FIG. 2 is a timing diagram of a three-dimensional image display device according to an exemplary embodiment of the present invention.

If the gate driver 400 sequentially applies the gate-on voltage Von to the gate lines GL1-GLn and the data driver 500 applies the data voltage Vd to the data lines DL1-DLm, the corresponding data voltage Vd is applied to the pixel PX of the display panel 300, thereby displaying the image of the corresponding gray. The right eye data voltage R and the left eye data voltage L included in the data voltage Vd may be alternately input to all pixels PX for one frame. The right eye data voltage R of one frame and the left eye data voltage L of one frame may be alternately input to all pixels PX.

An input period (referred to as "an insertion period") of an insertion data voltage Ba displaying the insertion data voltage Ba for the insertion image of a predetermined gray may be inserted between the input period of the right eye data voltage R and the input period of the left eye data voltage L. The insertion data voltage Ba divides the left eye image and the right eye image, thereby preventing crosstalk in which the left eye image and the right eye image appear to be overlapped. The gray level of the insertion image may be 0 or greater than 0 according to an exemplary embodiment. The insertion period may be about the same length as one frame.

The backlight unit 900 may emit light during a plurality of light emitting periods ON according to the backlight control signal. The display panel 300 may display one of the right eye image and the left eye image respectively according to the right eye data voltage R or the left eye data voltage L input to the pixel PX at a frame which overlaps each light emitting period ON of the backlight unit 900 or at a previous frame.

Each light emitting period ON may temporally overlap at least a portion of the insertion period, and may partially overlap the input period of the data voltage L or R of the frame directly before the corresponding insertion period. In other words, the light emitting period ON of the backlight unit 900 starts while the left eye data voltage L or the right eye data voltage R is input to at least one pixel PX among a plurality of pixels PX, thereby displaying the image. In detail, each light emitting period ON may start a first time period t1 before the completion point of the input of the left eye data voltage L or the right eye data voltage R or a third time period t3 from the start point of the input of the left eye data voltage L or the right eye data voltage R, and may finish a second time period t2 into the insertion period following the data voltages L and R. The sum of the first time period t1 and the third time period t3 may be one frame, the first time period t1 may be greater than 0 and may be equal to or less than one frame, and the second time period t2 may be equal to or greater than 0 and may be equal to or less than one frame. The exact lengths of the first, second, and third time periods t1, t2, t3 may be adjusted as appropriate.

The left eye shutter 60b or the right eye shutter 60a of the shutter member 60 may be opened while the backlight unit 900 is ON, respectively corresponding to the input period of the left eye data voltage L or the right eye data voltage R. Each of the left eye shutter 60b or the right eye shutter 60a may be opened during a part of the corresponding light emitting period ON. Each open period may start a fourth time period t4 before the start point of the corresponding light emitting period ON or after the start point of the light emitting period ON. Also, each open period may end a fifth time period t5 after the finish point of the corresponding light emitting period ON.

Next, a driving method of the three-dimensional image display device according to an exemplary embodiment of the present invention will be described with reference to FIG. 3, FIG. 4, FIG. 5, FIG. 6, FIG. 7, FIG. 8, FIG. 9, FIG. 10, FIG. 11, and FIG. 12 as well as FIG. 1 and FIG. 2.

Figure 3:
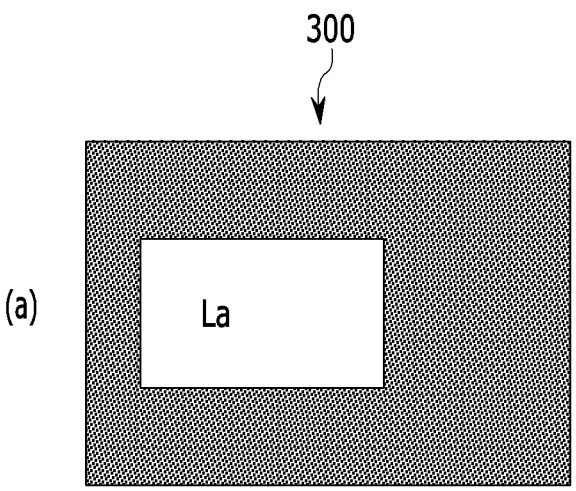
FIG. 3 is a view of a left eye image and a right eye image displayed by a three-dimensional image display device display panel according to an exemplary embodiment of the present invention.
Figure 3:
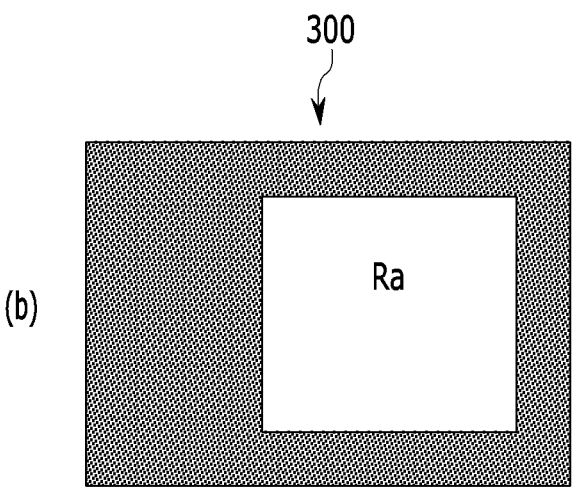
Figure 4:
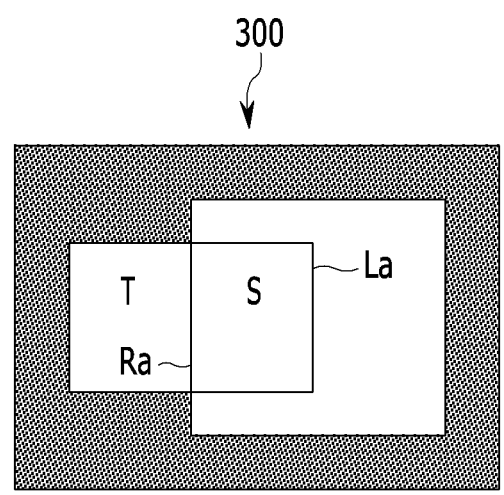
FIG. 4 is a view showing the left eye image and the right eye image shown in FIG. 3, FIG. 5 and FIG. 6 are waveform diagrams of a data voltage according to an exemplary embodiment of the present invention.
Figure 5:
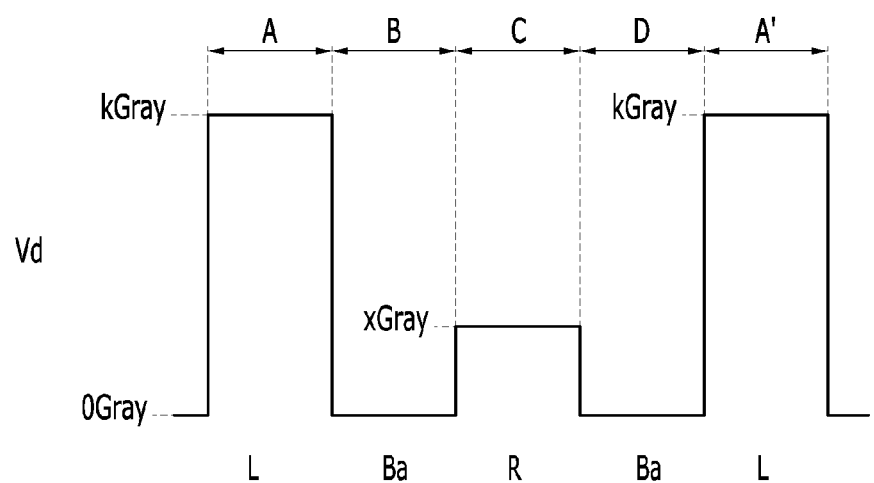
Figure 6:
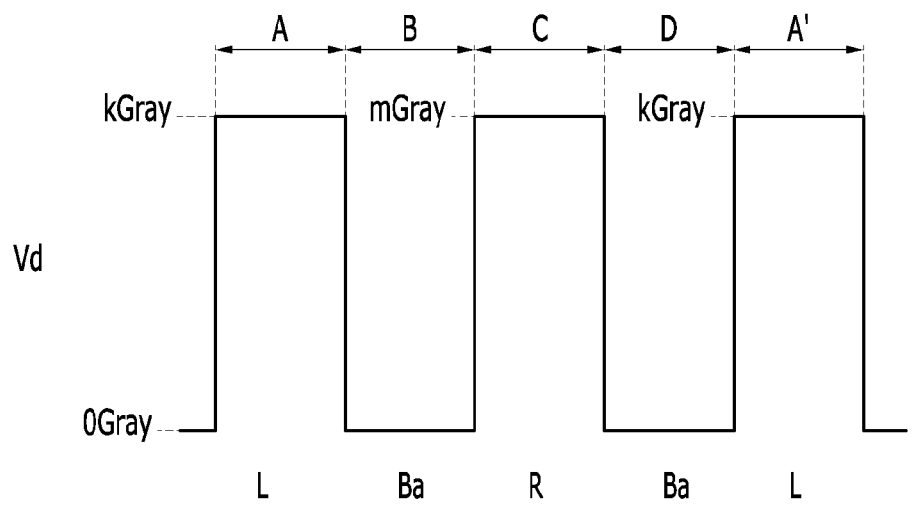
Figure 7:
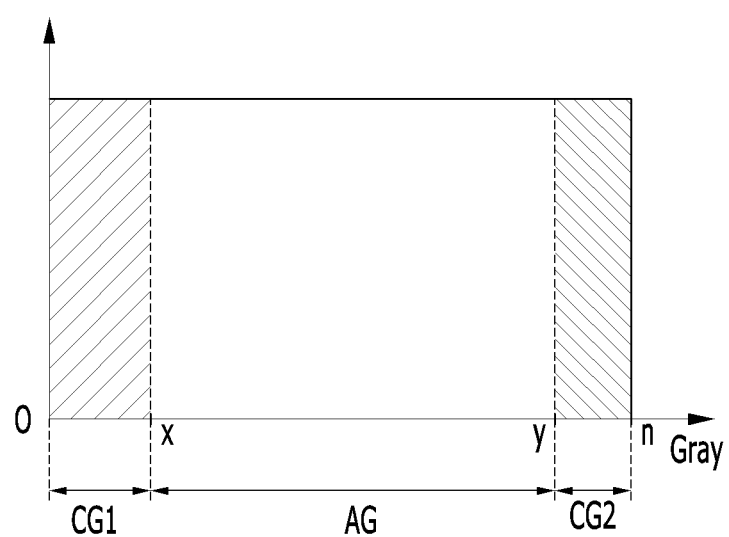
FIG. 7 is a graph dividing a gray region of a three-dimensional image display device according to an exemplary embodiment of the present invention.

FIG. 3 is a view of a left eye image and a right eye image displayed by a three-dimensional image display device of a display panel according to an exemplary embodiment of the present invention, FIG. 4 is a view showing the left eye image and the right eye image shown in FIG. 3, FIG. 5 and FIG. 6 are waveform diagrams of a data voltage according to an exemplary embodiment of the present invention, and FIG. 7 is a graph dividing a gray region of a three-dimensional image display device according to an exemplary embodiment of the present invention.

FIG. 3 (a) and FIG. 3 (b) respectively show the left eye image La and the right eye image Ra displayed at different times through the display panel 300 of the three-dimensional image display device according to an exemplary embodiment of the present invention. The present exemplary embodiment provides an example in which the background is black and the left eye image La and the right eye image Ra are white. In FIG. 3, for convenience, the left eye image La and the right eye image Ra respectively construct the portion of white image, however the left eye image La and the right eye image Ra respectively may construct the image that is displayed by all pixels PX of the display panel 300 during one frame. "White" may correlate with a maximum gray as a highest gray that the left eye image La and the right eye image Ra may display, and "black" may correlate with a minimum gray as a lower gray that the left eye image La and the right eye image Ra may display.

Referring to FIG. 4, the left eye image La and the right eye image Ra displayed in the frames neighboring each other via the insertion period interposed therebetween may respectively include an overlapping region S and a non-overlapping region T. In the overlapping region S, the left eye image La and the right eye image Ra both display white, and in the non-overlapping region T, one of the right eye image Ra and the left eye image La displays white and the other one displays black.

The data voltage Vd input to the pixel PX of the non-overlapping region T shown in FIG. 4 may have a waveform like FIG. 5, and the data voltage Vd input to the pixel PX of the overlapping region S shown in FIG. 4 may have a waveform like FIG. 6.

Referring to FIG. 5 and FIG. 6, the pixel of the overlapping region S and the non-overlapping region T of the display panel 300 is input with the left eye data voltage L during one frame A, the insertion data voltage Ba is input during the next frame B, the right eye data voltage R is input during the next frame C, the insertion data voltage Ba is input during the next frame D, and the above frames may be repeated from frame A'. When the entire gray range includes 0 to n-th level gray, the data voltage Vd for all of the left eye image, right eye image, and insertion image may be a voltage corresponding to the gray in a range from 0 gray level to the n-th gray level. Here, the data voltage Vd may be a relative voltage with reference to the common voltage Vcom, and in this case, the data voltage Vd corresponding to 0 gray may be set up as 0V. When the data voltage Vd is the voltage corresponding to the n-th gray level, the image may display white.

Referring to FIG. 5, in the non-overlapping region T of the left eye image La displayed in the display panel 300, the left eye data voltage L input during one frame A may be the voltage corresponding to the k gray (x≤k≤n, 0<x<n), and the right eye data voltage R input during the frame C may be the voltage corresponding to the x gray. Here, the k gray may be the n gray, in which case the left eye image may display white. In an exemplary embodiment that is described later, an example that the k gray is the gray greater than the x gray or white is presented.

Referring to FIG. 6, in the overlapping region S of the display panel 300, the left eye data voltage L input during the frame A and the frame A' may be the voltage corresponding to the k gray (x≤k≤n, 0<x<n), and the right eye data voltage R input during the frame C may be the m gray (x≤m≤n, 0<x<n). The k gray and the m gray may be the same as each other or different. Here, the k gray and the m gray may be the maximum gray (e.g., n gray) among the range of grays, and in this case, the left eye image and the right eye image may display white.

Meanwhile, in FIG. 5 and FIG. 6, the insertion data voltage Ba input in the insertion period may have the voltage for the gray less than the x gray. As one example, the insertion data voltage Ba may have the data voltage corresponding to 0 gray (black).

As described above, in the three-dimensional image display device according to an exemplary embodiment of the present invention, the minimum gray that may be capable of being displayed, among the grays for which the left eye image La and the right eye image Ra display to form three-dimensional images, is the x gray that is greater than 0 gray. The gray of the insertion image inserted between the left eye image La and the right eye image Ra is a gray that is equal to 0 gray (and less than x gray). That is, the gray of the left eye image La or the right eye image Ra displaying black has the x gray that is greater than 0 gray, and black of the insertion image has the gray that is less than the gray level of black of the left eye image La or the right eye image Ra. The x gray may be set up as a gray level that does not deteriorate the display quality of the low gray image of the three-dimensional image display device and will be described later. The selection of black gray of the left eye image or the right eye image and black gray of the insertion image may be made by the timing controller 600 or the integration controller 650.

Referring to FIG. 7, the period from 0 gray to x gray among the entire range of grays from 0 gray to n gray may be the gray region that is not used when displaying the left eye image La and the right eye image Ra (i.e., it is a low gray clipping region CG1). The low gray clipping region CG1 may be used as the gray of the insertion image in the insertion period, and the gray of the insertion image may display black.

Also, the gray region that is higher level than y gray and equal to or less than n gray, i.e. the high gray clipping period CG2, may not be used when displaying the left eye image La and the right eye image Ra. At this time, the y gray may be changed according to the value of the x gray. As the x gray is increased, the y gray may become gradually closer to the n gray. According to an exemplary embodiment, the y gray as the minimum gray of the high gray clipping period CG2 may be the n gray and the high gray clipping period CG2 may not exist. The gray region outside the low gray clipping period CG1 and the high gray clipping period CG2, as the available gray region AG, may define the available gray range for the left eye image La and the right eye image Ra.

Figure 8:
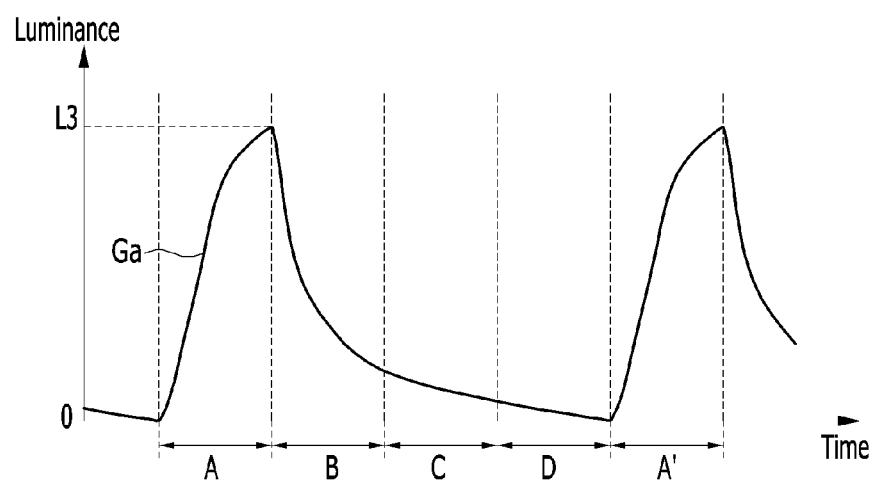
FIG. 8 is a graph showing a change of a luminance of an image according to the data voltage shown in FIG. 5 according to time.
Figure 9:
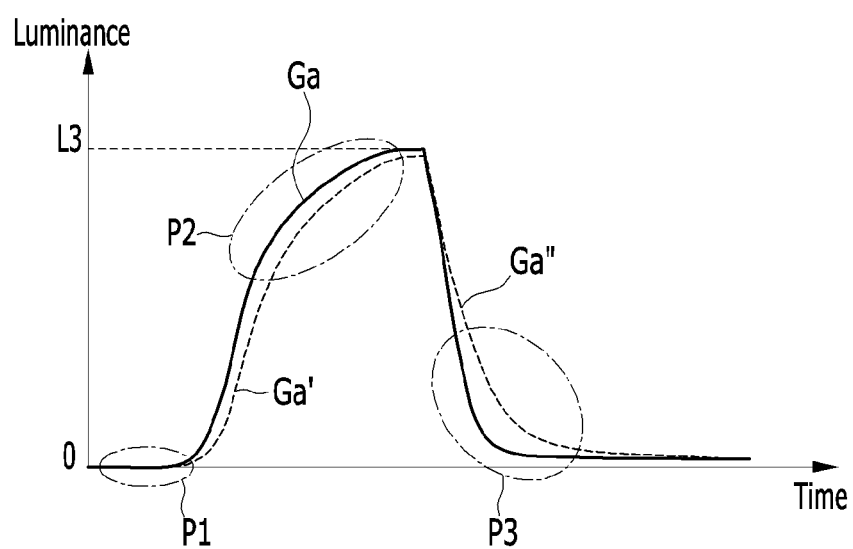
FIG. 9 is a graph showing a portion of the graph shown in FIG. 8.
Figure 10:
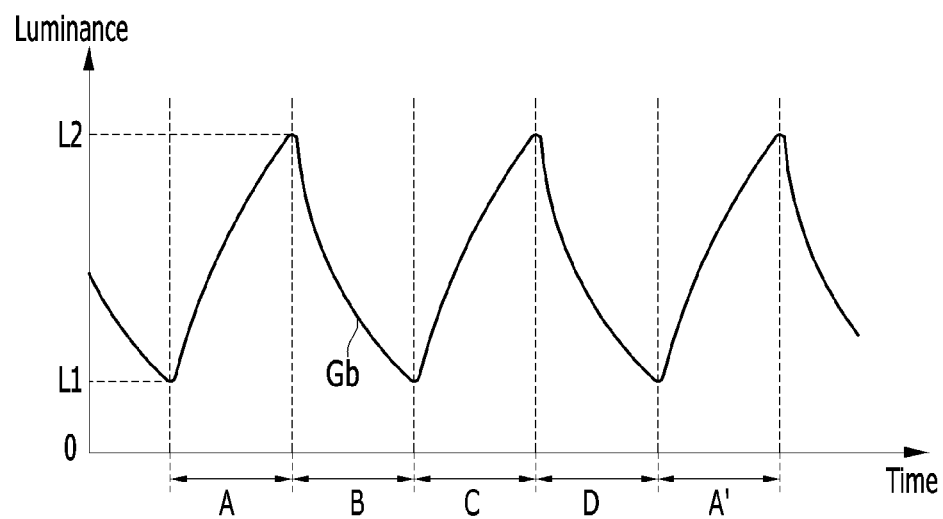
FIG. 10 is a graph showing a change of luminance of an image according to the data voltage shown in FIG. 6 according to time.

FIG. 8 is a graph showing a change of luminance of an image according to the data voltage shown in FIG. 5 as a function of time. FIG. 9 is a graph showing a portion of the graph shown in FIG. 8, and FIG. 10 is a graph showing a change of luminance of an image according to the data voltage shown in FIG. 6 as a function of time.

Referring to FIG. 5, FIG. 8, and FIG. 9, when the left eye image La may represent the k gray, the luminance Ga increases during the frame A such that the maximum luminance L3 is represented and the luminance Ga is decreased during the frame B of the insertion period. The right eye image Ra represents the x gray level of black during the next frame C such that the luminance Ga that is decreased in the frame B continues to decrease in frames C and D, eventually representing the luminance near black to be represented by the x gray level. In the next frame D, the insertion image as black is displayed such that the luminance Ga continues to decrease. In the next frame A', the left eye image La of the k gray is again displayed such that the luminance Ga is increased toward the maximum luminance L3.

The right eye image Ra represents black in the frame C, and the gray is expressed as x gray (x>0) not 0 gray such that the right eye data voltage R also has the value that is greater than the insertion data voltage Ba (e.g., 0V). Accordingly, although the pixel PX of the display panel 300 displays black in the frame C, a right eye data voltage R for the x gray that is greater than 0 gray is applied, and this right eye data voltage R is the value near the side of the left eye data voltage L for the k gray to be applied in the next frame A' compared with 0 gray, and this state may be maintained during the frame D which is the insertion period. For example, when the display panel assembly 1000 is a liquid crystal display in a vertical alignment (VA) mode, in a case that the right eye data voltage R is not 0V in frame C, the liquid crystal molecules (not shown) are in a pretilt state in the vertical alignment mode and this may also be maintained in the frame D. This effect is called a pretilt effect. This period having the pretilt effect corresponds to the region P1 in FIG. 9.

As described above, by the pretilt effect of the frames C and D, the luminance Ga displayed by the left eye image La in the frame A' may quickly reach the maximum luminance L3 as shown in FIG. 9, compared with a graph Ga', which depicts the case where black gray of the left eye image La or the right eye image Ra is 0 gray. Accordingly, the maximum luminance L3 displayed by the left eye image La may be further increased.

The gray of the insertion image is a gray that is less than the x gray in the insertion period of the frame B such that the gray of the insertion image is lower than the gray of the next frame C, and the corresponding insertion data voltage Ba is also lower than the right eye data voltage R of the next frame C. Accordingly, as shown in FIG. 9, compared with the graph Ga", which depicts the case that the insertion image is the same as the x gray as the minimum gray of the left eye image La or the right eye image Ra, the right eye image Ra may quickly decrease into black luminance in the frame C, which is referred to as an undershoot effect. By this undershoot effect, the luminance is quickly decreased in the frame B and may quickly become close to black luminance which is a target luminance to be displayed in the insertion period in the frame C, such that the crosstalk between the left eye image La and the right eye image Ra may be further effectively prevented.

Next, referring to FIG. 10, when the left eye image La and the right eye image Ra both display the k gray or the m gray that is greater than the x gray, the luminance Gb is increased during each of the frames A, C, and A' thereby representing the maximum luminance L2, and the luminance Ga is decreased during each of the frames B and D as the insertion period. FIG. 10 shows the example that the k gray and the m gray are the same gray, however the k gray and the m gray may be different from each other. In this case, the maximum luminance of the frame C of FIG. 10 may be different from the maximum luminance L2 of other frames A and A'. Meanwhile, the insertion image has a gray that is less than the x gray, for example 0 gray. However, the luminance Gb is not completely decreased to 0 during the frames B and D of the insertion period according to the response speed of the display panel 300 and may have the minimum luminance L1. When the response speed of the display panel 300 is fast, the minimum luminance L1 may be further decreased during the insertion period. Also, the minimum luminance L1 is not 0 in the insertion period such that the maximum luminance L2 of the left eye image La or the right eye image Ra representing the k gray or the m gray may be increased in the next frames A, C, and A'.

Like an exemplary embodiment of the present invention, if the minimum gray of the left eye image La or the right eye image Ra is determined as the x gray that is greater than 0 gray and the insertion image of the insertion period is determined as the gray that is smaller than the x gray, by the above described pretilt effect, the maximum luminance L3 of the left eye image La in the frame A' shown in FIG. 8 and the maximum luminance L2 of the left eye image La in the frame A' shown in FIG. 9 may be recognized as approximately the same. Thus, the luminance of the overlapping region S and the non-overlapping region T of the left eye image La may be approximately the same in the image of the above-described display panel 300 shown in FIG. 3 and FIG. 4, and the display quality of the three-dimensional image may be increased.

Also, as shown in FIG. 8, the luminance may be quickly increased into the target luminance in the next frame A' by the above-described pretilt effect when continuously displaying black in three frames B, C, and D such that the high gray clipping period CG2 may be further reduced and the luminance of the display image may be further increased.

In the above description related to the exemplary embodiment shown in FIG. 3 to FIG. 10, the left eye image La represents the k gray and the right eye image Ra represents the x gray. However, this is not a limitation of the invention. For example, in FIG. 4, the non-overlapping region T may indicate a right region of the right eye image Ra, and in FIG. 5, the left eye data voltage L may correspond to the x gray and the right eye data voltage R may correspond to the k gray.

Figure 11:
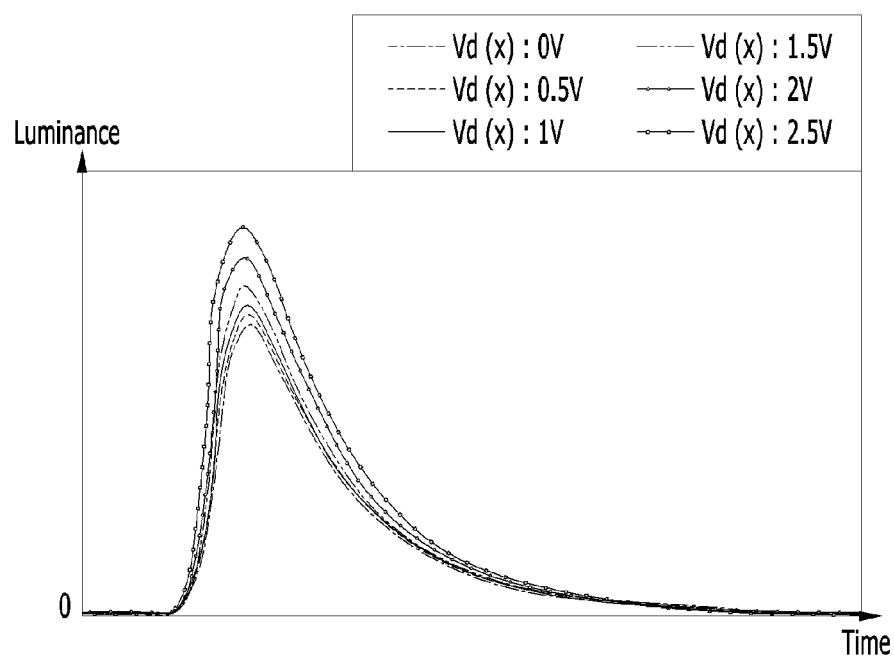
FIG. 11 is a graph showing a change of luminance according to several data voltages according to time for a minimum gray (x) of a left eye image or a right eye image in a three-dimensional image display device according to an exemplary embodiment of the present invention.
Figure 12:
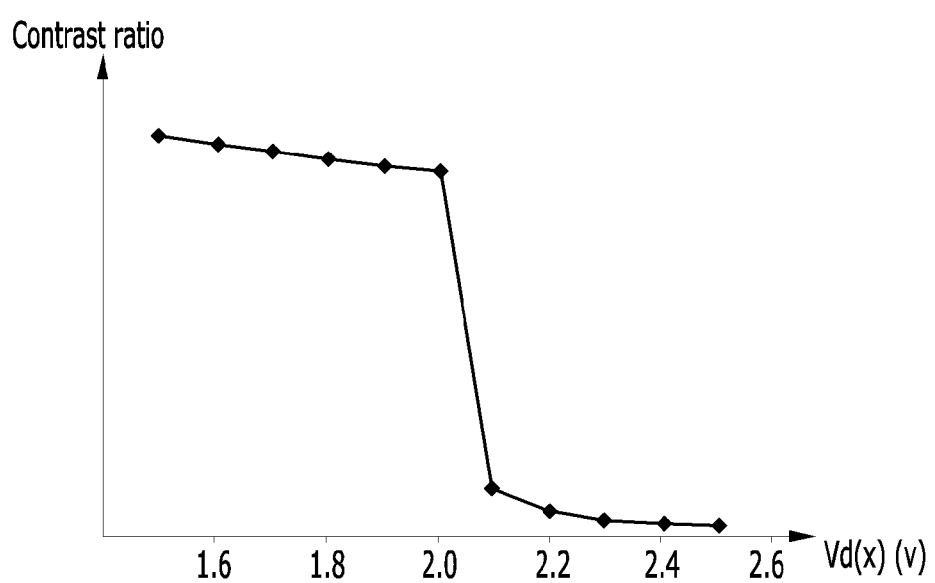
FIG. 12 is a graph of a contrast ratio according to a data voltage for a minimum gray (x) of a minimum left eye image or right eye image in a three-dimensional image display device according to an exemplary embodiment of the present invention.

FIG. 11 is a graph showing a change of luminance at different data voltages as a function of time for a minimum gray (x) of a left eye image or a right eye image in a three-dimensional image display device according to an exemplary embodiment of the present invention, and FIG. 12 is a graph of a contrast ratio according to a data voltage for a minimum gray (x) of a minimum left eye image or right eye image in a three-dimensional image display device according to an exemplary embodiment of the present invention.

The data voltage Vd (x) for the x gray or the x gray that is the minimum gray of the above-described left eye image La or right eye image Ra may be controlled according to the three-dimensional image display device.

Referring to FIG. 11, as the data voltage Vd (x) for the x gray is increased, the luminance of the left eye image La or the right eye image Ra may be increased. However, when the data voltage Vd (x) for the x gray is very low, the effect of increasing the luminance by using the above-described pretilt effect may be slight. Accordingly, the minimum value of the data voltage Vd (x) for the x gray may be appropriately controlled.

In contrast, when the data voltage Vd (x) for the x gray is higher than the threshold voltage Vth, the luminance of black image of the left eye image La or the right eye image Ra is increased such that the contrast ratio may not be good. Referring to FIG. 12, when the data voltage Vd(x) for the x gray is greater than about 2V, it may be confirmed that the contrast ratio is quickly decreased. Accordingly, the threshold voltage Vth of the data voltage Vd (x) for the x gray may be set up as about 2V. That is, if it is set up that the range of the data voltage Vd (x) for the x gray is greater than the insertion data voltage Ba for the gray of the insertion image and less than about 2V, the contrast ratio of the three-dimensional image display device may be good.

The display panel assembly 1000 of the three-dimensional image display device according to an exemplary embodiment of the present invention may be the liquid crystal display, and this liquid crystal display includes a liquid crystal display disclosed in the prior art. At this time, the liquid crystal display may be the liquid crystal display including liquid crystal molecules according to the vertical alignment (VA) mode.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of Symbols> | |
|---|---|
| 60: shutter member | 300: display panel |
| 400: gate driver | 500: data driver |
| 600: timing controller | 650: integration controller |
| 900: backlight unit | 950: backlight controller |
| 1000: display panel assembly | Ba: insertion data voltage |

What is claimed is:

1. A three-dimensional image display device comprising:
a display panel assembly including a display panel including a plurality of pixels alternately displaying a left eye image and a right eye image and a data driver transmitting a data voltage to the plurality of pixels,
wherein a display period of an insertion image is positioned between a display period of the left eye image and a display period of the right eye image,
a minimum gray level of the left eye image or the right eye image is a first gray level that is greater than 0 gray level, and
a gray level of the insertion image is a second gray level that is lower than the first gray level and is constant.

2. The three-dimensional image display device of claim 1, wherein
the second gray level is 0.

3. The three-dimensional image display device of claim 2, wherein
a data voltage for the first gray level is in a range from 0V to 2V.

4. The three-dimensional image display device of claim 3, wherein
a maximum gray level of the left eye image or the right eye image is a third gray level that is lower than or equal to a maximum gray level of an entire gray range.

5. The three-dimensional image display device of claim 4, wherein
the third gray level increases with the first gray level.

6. The three-dimensional image display device of claim 5, wherein
in a first region of the display panel, a first image which is one of the left eye image and the right eye image has the first gray level, and a second image which is a remaining portion of the left eye image and the right eye image has a fourth gray level that is greater than the first gray level,
in a second region of the display panel, the first image has a fifth gray level that is higher than the first gray level, and the second image has the fourth gray level, and
a luminance of the second image displayed in the first region and a luminance of the second image displayed in the second region are substantially the same.

7. The three-dimensional image display device of claim 6, wherein
the display panel includes liquid crystal molecules in a vertical alignment (VA) mode, and
the liquid crystal molecules are in a pretilt state when the left eye image or the right eye image has the first gray level.

8. The three-dimensional image display device of claim 1, wherein
the data voltage for the first gray level is in a range from 0V to 2V.

9. The three-dimensional image display device of claim 1, wherein
a maximum gray level of the left eye image or the right eye image is a third gray level, and
the third gray level is lower than or equal to a maximum gray level of an entire gray range.

10. The three-dimensional image display device of claim 9, wherein
the third gray level increases with the first gray level.

11. The three-dimensional image display device of claim 10, wherein
in a first region of the display panel, a first image which is one of the left eye image and the right eye image has the first gray level, and a second image which is a remaining image other than the left eye image or the right eye image has a fourth gray level that is greater than the first gray level,
in a second region of the display panel, the first image has a fifth gray level that is higher than the first gray level, and the second image has the fourth gray level, and a luminance of the second image displayed in the first region and a luminance of the second image displayed in the second region are substantially the same.

12. The three-dimensional image display device of claim 11, wherein
the display panel includes liquid crystal molecules in a vertical alignment (VA) mode, and
the liquid crystal molecules are in a pretilt state when the left eye image or the right eye image is the first gray level.

13. The three-dimensional image display device of claim 1, wherein
in a first region of the display panel, a first image which is one of the left eye image and the right eye image has the first gray level, and a second image which is a remaining image other than the left eye image or the right eye image has a fourth gray level that is greater than the first gray level,
in a second region of the display panel, the first image has a fifth gray level that is higher than the first gray level, and the second image has the fourth gray level, and a luminance of the second image displayed in the first region and a luminance of the second image displayed in the second region are substantially the same.

14. The three-dimensional image display device of claim 1, wherein
the display panel includes liquid crystal molecules in a vertical alignment (VA) mode, and
the liquid crystal molecules are in a pretilt state when the left eye image or the right eye image has the first gray level.

15. A method of driving a three-dimensional image display device having a display panel assembly including a display panel including a plurality of pixels alternately displaying a left eye image and a right eye image and a data driver transmitting a data voltage to the plurality of pixels, comprising:
displaying an insertion image between a display period of the left eye image and a display period of the right eye image, wherein a minimum gray level of the left eye image or the right eye image is a first gray level that is greater than 0 gray level, and a gray level of the insertion image is a second gray level that is lower than the first gray level and is constant.

16. The method of claim 15, wherein
the second gray level is 0.

17. The method of claim 15, wherein
a data voltage for the first gray is in a range from 0V to 2V.

18. The method of claim 15, wherein
a maximum gray level of the left eye image or the right eye image is a third gray level that is lower than or equal to a maximum gray level of entire gray range.

19. The method of claim 15, further comprising:
displaying a first image having the first gray level and a second image having a fourth gray level that is greater than the first gray level in a first region of the display panel; and displaying a first image having a fifth gray level that is higher than the first gray level and a second image having the fourth gray level in a second region of the display panel, wherein the first image is one of the left eye image and the right eye image and the second image is the other image, and a luminance of the second image displayed in the first region and a luminance of the second image displayed in the second region are substantially the same.

20. The method of claim 15, wherein the display panel includes liquid crystal molecules in a vertical alignment (VA) mode, and the liquid crystal molecules are in a pretilt state when the left eye image or the right eye image has the first gray level.

* * * * *